D. S. FRENCH.
PIANO DAMPER BLOCK.
APPLICATION FILED MAY 20, 1916.
1,201,572.
Patented Oct. 17, 1916.
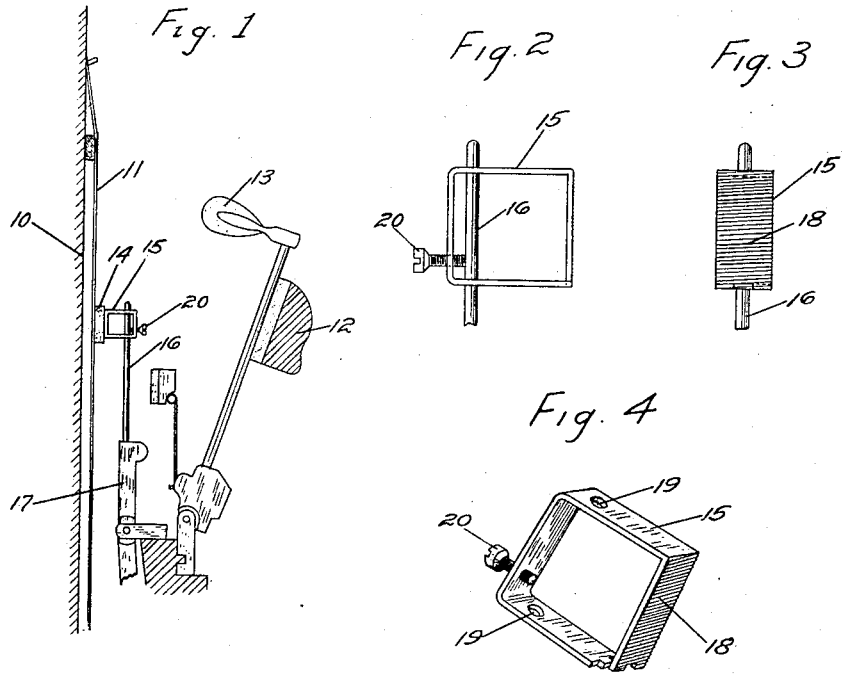
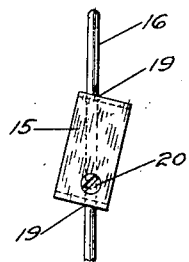
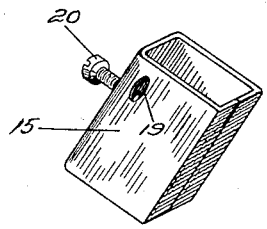
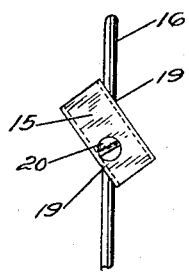
WITNESS
Lester F. Hayden.
INVENTOR
David S. French
BY
A. M. Wooster
ATTORNEY

UNITED STATES PATENT OFFICE.

DAVID S. FRENCH, OF BRIDGEPORT, CONNECTICUT, ASSIGNOR TO THE CORNWALL AND PATTERSON MANUFACTURING COMPANY, OF BRIDGEPORT, CONNECTICUT, A CORPORATION OF CONNECTICUT.

PIANO DAMPER-BLOCK.

1,201,572.

Specification of Letters Patent.

Patented Oct. 17, 1916.

Application filed May 20, 1916. Serial No. 98,788.

*To all whom it may concern:*

Be it known that I, DAVID S. FRENCH, a citizen of the United States, residing at Bridgeport, county of Fairfield, State of Connecticut, have invented an Improvement in Piano Damper-Blocks, of which the following is a specification.

This invention relates to piano actions and has for its object to provide a skeleton damper block which can be formed from a strip of sheet metal. I find that it is cheaper and better in every way to make these blocks of sheet metal for the reason that the metallic block does away with the use of bushings and wholly eliminates the trouble and loss that has heretofore resulted from the splitting of the blocks in inserting the bushings, likewise all danger of the blocks swelling in damp weather and of shrinking cracking and becoming loose on the damper wire during the portion of the year when artificial heat is required, as when the instrument is in a room heated by steam. Furthermore, should my novel blocks become loose from any cause whatever, they may be secured by simply tightening a set screw and may be readily removed and replaced in repairing a piano or when new dampers are required. In order to accomplish these important results, I have devised the novel sheet metal damper block which I will now describe, referring to the accompanying drawing forming a part of this specification and using reference characters to indicate the several parts.

Figure 1 is a sectional elevation of so much of a piano action as is necessary to illustrate my novel invention, and showing a damper carried by my novel damper block in place on a damper wire; Fig. 2 a view on an enlarged scale showing how the damper block is secured to the damper wire; Fig. 3 a view as seen from the right in Fig. 2; Fig. 4 a perspective view showing one mode of securing the ends of the strip together in forming the damper block; Fig. 5 a perspective view of a variant form adapted for attachment obliquely to the damper wire, and Figs. 6 and 7 are views showing different oblique attachments of my novel damper block on the damper wire.

10 indicates the sounding board of a piano, 11 one of the strings, 12 the hammer rest rail, 13 one of the hammers, 14 a damper, 15 my novel damper block, 16 a damper wire, and 17 a damper lever.

It is not considered necessary for the purposes of this specification to illustrate a piano action more in detail, for the reason that my novel damper block is equally adapted to any of the various styles and types of piano actions in general use.

My novel damper block consists essentially of a strip of sheet metal bent to suitable shape, ordinarily though not necessarily a rectangular shape, as shown in the drawing, and provided with a corrugated or otherwise roughened face, indicated by 18, for the attachment of the damper, which is a block of felt and is usually secured to the damper block by gluing it in place. The block is provided in opposite sides with holes 19 through which the damper wire passes, the back of the block being provided with a set screw 20 adapted to engage the wire to retain the block in place. It is of course well understood that a portion of the strings of a piano lie obliquely to a central line, either vertical or horizontal. As the portion of an action shown in the drawing is that of an upright piano, I will use the term "vertical" for convenience in description. For use in connection with strings lying vertically or substantially so, the holes are formed directly opposite to each other and lead straight through the walls of the block. The ends of the strip may be secured together at one of the corners of the block by means of a tongue and groove connection, as shown in Fig. 4. This is not essential, however.

The form of block illustrated in Figs. 5, 6 and 7 is for use in connection with strings placed obliquely to a central line. The principle is just the same, but a relatively wider strip is used and the blocks are differently shaped. The ends of the strip are shown as butting together in the midwidth of the face of the block. The holes may pass obliquely through the top and bottom of the block, one hole being relatively near one side of the block, and the other relatively near the opposite side of the block, as in Fig. 6, or they may pass obliquely through the sides of the block, one hole being relatively near the top of the block and the other relatively near the bottom of the block, as shown in Fig. 7.

The operation is the same in all of the forms. The damper is secured to the block, and then the block is properly placed on the damper wire and locked there by means of the set screw. The damper block and damper may be adjusted at any time by loosening the set screw or they may be readily removed and replaced whenever required.

Having thus described my invention, I claim:

1. A piano damper block formed from sheet metal and having holes to receive a damper wire and a roughened face for the attachment of a damper.

2. A piano damper block formed from a strip of sheet metal bent to rectangular form and having a roughened face for the attachment of a damper, holes to receive a damper wire and a set screw to retain the block to the wire.

3. A piano damper block formed from a strip of sheet metal bent to rectangular shape with its ends abutting in the face of the block, and having holes passing through the walls obliquely to receive a damper wire and a screw in the back adapted to engage the wire to retain the block in place.

In testimony whereof I affix my signature.

DAVID S. FRENCH.

Copies of this patent may be obtained for five cents each, by addressing the "Commissioner of Patents, Washington, D. C."